Nov. 28, 1933.     R. B. DOME     1,937,333
MAGNETOSTRICTION OSCILLATION GENERATOR
Filed Oct. 23, 1929
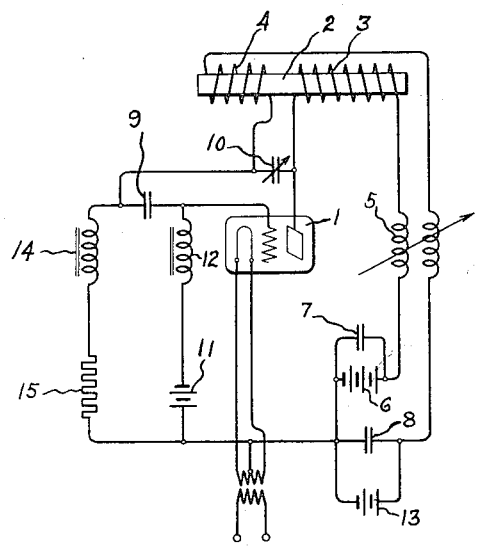
Inventor:
Robert B. Dome,
by Charles E. Mullan
His Attorney.

Patented Nov. 28, 1933

1,937,333

UNITED STATES PATENT OFFICE 1,937,333

MAGNETOSTRICTION OSCILLATION GENERATOR

Robert B. Dome, Schenectady, N. Y., assignor to General Electric Company, a corporation of New York Application October 23, 1929. Serial No. 401,846

6 Claims. (Cl. 250—36)

My invention relates to improvements in electron discharge oscillation generators of the type in which the frequency of oscillations produced is controlled by means of a magnetostrictive body.

One of the objects of my invention is to provide improvements in generators of the type mentioned whereby the efficiency of operation of the generator is greatly increased.

A further object of the invention is to provide an improved circuit arrangement whereby losses of energy in the magnetostrictive body, and hence frequency variations due to temperature variations in the magnetostrictive body are reduced.

Still a further object of the invention is to provide in an oscillation generator of the type indicated means for polarizing the magnetostrictive body independently of the anode potential of the discharge device.

The novel features which I believe to be characteristic of my invention are set forth with particularity in the appended claims. My invention itself, however, will best be understood by reference to the following description taken in connection with the accompanying drawing which illustrates a single embodiment of my invention.

Referring to the drawing I have shown at 1 an electron discharge device of the usual three-element type which is connected in a circuit for the generation of oscillations which are controlled in frequency by a magnetostrictive body 2. This body may comprise a rod of suitable metallic composition such for example as nickel, or an alloy of nickel and iron, copper or cobalt, although many other metals and alloys of different metals may be used as is now well known in the art.

Surrounding the magnetostrictive body 2 are a pair of windings 3 and 4, the winding 3 being connected in circuit between the anode and cathode of the discharge device 1 through the primary winding of a feedback coil 5, and a source of potential 6. A suitable by-pass condenser 7 is connected across the source of potential 6. The winding 4 about the magnetostrictive body 2 is connected in an alternating current circuit which extends from the cathode through the by-pass condenser 8, secondary winding of the feedback coil 5, winding 4, blocking condenser 9 to the grid of the discharge device. Thus it will be apparent that the coil 3 about the magnetostrictive body is excited with alternating current energy from the anode circuit of the discharge device, and that energy is transferred from the anode circuit to the grid circuit through the magnetostrictive body.

The tuning condenser 10 is adjusted to resonate with the inductance of the circuit comprising the coils 3 and 4, the primary and secondary windings of the feedback coil 5 and the by-pass condensers 7 and 8, this circuit comprising the oscillatory circuit of the generator. By means of this condenser the frequency of the oscillations produced may be made to conform with the natural period of the magnetostrictive body whereupon this frequency will be maintained constant by the magnetostrictive body over a considerable range of adjustment of the condenser 10 or other elements of the circuit. In the arrangement shown the condenser is connected between the plate and grid circuits for the purpose of simultaneously tuning both of these circuits. It will be understood, however, that this is a matter of convenience and that any other suitable type of tuning means may be employed.

A suitable grid bias is maintained upon the discharge device by means of a battery 11 connected between the cathode and the grid through a choke coil 12.

I have found that by employing the feedback coil 5 connected, as illustrated, in circuit with the coils 3 and 4 or other suitable means whereby a considerable amount of energy is supplied from the anode circuit to the grid circuit without affecting the magnetostrictive body that a very large increase in output from the generator may be produced, and that the further advantage may be had in that the magnetostrictive body may be maintained at a comparatively low temperature. That is by the use of the coil 5 the oscillatory voltage of the oscillating circuit of the system is divided between the coils 3 and 4 and the windings of the coil 5. Because of the increase in voltage supplied to the grid due to the action of coil 5 and the resulting increase in amplitude of variation of impedance of the discharge device the anode current is greatly increased. This increase in anode current enables the use of a reduced number of turns in the coil 3 to produce desired excitation of bar 2 without objectionable heating. Thus with a given discharge device operating with its rated anode voltage both an increase in oscillatory voltage and current are obtainable without increase in the heating of the bar 2.

In initially adjusting the system for operation I have found that the condenser 10 may first be so adjusted that the frequency of the oscillations produced, independently of the magnitude thereof, are controlled by the magnetostrictive body. I then so adjust the feedback coil 5 that the maximum of oscillations are produced. I have found experimentally that the maximum amplitude of oscillations produced may be several times that which would normally be produced by an oscillation generator of the type indicated from which the coil 5 is omitted.

When this type of tuning means shown is employed, in which the tuning condenser 10 is connected between the plate and grid circuits, it will of course be obvious that a certain amount of energy will be supplied to the grid through the condenser. This energy is in proper phase relation to cause the production of oscillations. However, in magnetostrictive generators, as is well known, the coils 3 and 4, are wound in such relation with respect to each other as to transfer energy through their inductance effect to the grid in phase relation with respect to the anode potential opposite to that required to cause the production of oscillations. Thus the energy supplied from the anode to the grid through these two elements of the circuit is in a large measure neutralized. The feed-back coil 5 therefore provides the principal portion of the electrical transfer of energy to the grid circuit. I have found that this electrical transfer of energy through the coil 5 preferably should be several times as great as that due to the magnetostrictive body.

For the purpose of polarizing the magnetostrictive body it will be noticed that the plate current of the oscillation generator passes through the coil 3. I have found, however, that with a magnetostrictive body of cross-sectional area such that its temperature under operating conditions is maintained within desired limits, the output from the generator may be further increased by magnetizing the magnetostrictive body to an extent greater than that which can be effected by passing the plate current through the coil 3. That is, with coils 3 and 4 properly constructed for the purposes of exciting the magnetostrictive body and transferring energy therefrom to the grid the plate current of the discharge device flowing through the coil will not produce a magnetic field of sufficient intensity to cause the most efficient operation of the generator. To further magnetize the magnetostrictive body the source of unidirectional potential 13 is connected in circuit with the coil 4, choke coil 14 and resistance 15 as previously indicated. The choke coils 12 and 14, of course, prevent the leakage of high frequency alternating current to the cathode of the discharge device. The resistance 15 may be used to control the magnitude of direct current flowing in the coil 4.

In this way the polarizing field may be increased to any desired value independently of the amount of current flowing in the anode circuit and the value of the polarizing field may be maintained independently of the excitation supplied to the magnetostrictive body. Further by this means the polarizing field may be made most intense directly within the coils 3 and 4. These coils of course may be wound in end to end relation, or one within the other as desired.

In the normal operation of the generator the alternating current electromotive force supplied to the winding 3 of the magnetostrictive body may be maintained comparatively small as, for example, in the neighborhood of a quarter of the total output of electromotive force. In this way excessive heating of the magnetostrictive body and losses therein are reduced and, similarly, frequency variations due to the changing temperature of the magnetostrictive body are minimized.

It will, of course, be apparent that the source of electromotive force 13 may be connected in circuit, either in series or parallel, with either or both of the coils 3 and 4 and, further, that any type of additional coupling between the anode and the grid circuit may be used other than the inductive coupling comprised in the feedback coil 5.

Thus, while I have shown a single embodiment of my invention it will be understood that many modifications may be made in the circuit arrangement, and in the instrumentalities employed, without departing from the spirit and scope thereof, and I therefore contemplate by the appended claims to cover any such modifications as fall within the true spirit and scope of my invention.

What I claim as new and desire to secure by Letters Patent of the United States is:

1. The method of operating a magnetostrictive electron discharge oscillation generator having an oscillating circuit, an anode circuit, a grid circuit, and a coupling between said circuits including a magnetostrictive body which includes subjecting the magnetostrictive body to a relatively small portion only of the total oscillatory energy of said oscillating circuit, and supplying energy from the anode circuit to the grid circuit in addition to that supplied through the magnetostrictive body.

2. In an oscillation generator, an electron discharge device having an anode circuit and a grid circuit, a coupling between said circuits including a magnetostrictive body, said circuits and coupling being arranged to form an oscillatory circuit whereby oscillations are produced by said discharge device, and said oscillatory circuit including means for tuning said oscillation generator to the natural frequency of said magnetostrictive body, means for subjecting the magnetostrictive body to a relatively small portion only of the total oscillatory voltage produced by said oscillation generator, and means for supplying energy from the anode circuit to the grid circuit in proper phase to support oscillations.

3. In an oscillation generator, an electron discharge device having an anode, a cathode and a grid, a magnetostrictive body, a circuit between said grid and cathode, a circuit between said anode and cathode, means for tuning said circuits to resonance at the natural period of said magnetostrictive body, said tuned circuits including an electrical coupling between said circuits whereby energy is transferred from the anode circuit to the grid circuit and an additional mechanical coupling between said circuits including said magnetostrictive body whereby sufficient energy is transferred from the anode circuit to the grid circuit through said magnetostrictive body to control the frequency of oscillations produced in accordance with the character of said magnetostrictive body, the energy transferred through said electrical coupling being substantially greater than that supplied through said mechanical coupling.

4. In an oscillation generator, an electron discharge device having an anode, a cathode, and a grid, a circuit between the anode and cathode, a circuit between the grid and cathode, a magnetostrictive body, each of said circuits including a coil wound about said magnetostrictive body and proportioned to cause sufficient energy to be supplied to said body and from said body to said grid to cause the frequency of said generator to be controlled thereby, and an additional coil in each circuit arranged in inductive relation with each other and connected in series with said first coils thereby to supply sufficient energy from the anode to the grid substantially to increase the amplitude of oscillations produced.

5. In an oscillation generator, an electron discharge device having an anode, a cathode, and a grid, a magnetostrictive body, windings about said body, one of said windings being connected to the anode and cathode and another of said windings being connected to the grid and cathode whereby energy is transferred from the anode to the grid through said magnetostrictive body, a source of anode potential, and means for causing a unidirectional current to flow in at least one of said windings having a value independent of said anode potential whereby a unidirectional field in said body is produced.

6. In an oscillation generator, an electron discharge device having an anode having potential impressed thereon, a cathode, and a grid, a magnetostrictive body, windings about said body, one of said windings being connected to the anode and cathode and another of said windings being connected to the grid and cathode whereby energy is transferred from the anode to the grid through said magnetostrictive body, additional means for transferring energy from the anode to the grid without affecting said magnetostrictive body, and means for causing a unidirectional current to flow in at least one of said windings having a value independent of the potential impressed on the anode whereby a unidirectional magnetic field in said body is produced.

ROBERT B. DOME.